United States Patent [19]

Anderson

[11] Patent Number: 4,561,786
[45] Date of Patent: Dec. 31, 1985

[54] TEMPERATURE MEASURING APPARATUS

[75] Inventor: Alan S. Anderson, Littleton, Mass.

[73] Assignee: Williamson Corporation, Concord, Mass.

[21] Appl. No.: 589,745

[22] Filed: Mar. 15, 1984

[51] Int. Cl.<sup>4</sup> ............................................. G01J 5/30
[52] U.S. Cl. .................................. 374/129; 250/339; 374/127; 374/128
[58] Field of Search ............... 374/128, 127, 124, 129, 374/170, 104; 250/339, 238; 356/418, 419

[56] References Cited

U.S. PATENT DOCUMENTS

| | | | |
|---|---|---|---|
| 3,474,671 | 10/1969 | Byron | 374/127 |
| 3,539,807 | 11/1970 | Bickel | 374/129 X |
| 3,611,805 | 10/1971 | Hushikari | 374/127 |
| 3,828,173 | 8/1974 | Knepler | 250/339 |
| 3,902,067 | 8/1975 | Anderson | 250/342 |
| 3,922,550 | 11/1975 | Crowley et al. | 374/128 X |
| 3,932,744 | 1/1976 | Anderson | 250/339 X |
| 4,045,670 | 8/1977 | Anderson | 374/124 X |
| 4,143,971 | 3/1979 | Levy et al. | 356/418 |
| 4,421,411 | 12/1983 | Ida | 250/339 |
| 4,464,067 | 8/1984 | Hanaoka | 370/170 |
| 4,466,748 | 8/1984 | Needham | 374/129 |

Primary Examiner—Daniel M. Yasich
Attorney, Agent, or Firm—Henry D. Pahl, Jr.

[57] ABSTRACT

In the temperature measuring apparatus disposed herein, a first intermediate output signal is obtained which is a function of the ratio of the brightness of a target at two different wavelengths and a second intermediate output signal is generated which is a function of the brightness of the target at a single wavelength. The two intermediate output signals are combined in preselectable proportion to yield a temperature output signal which is relatively insensitive to target surface characteristics.

3 Claims, 1 Drawing Figure

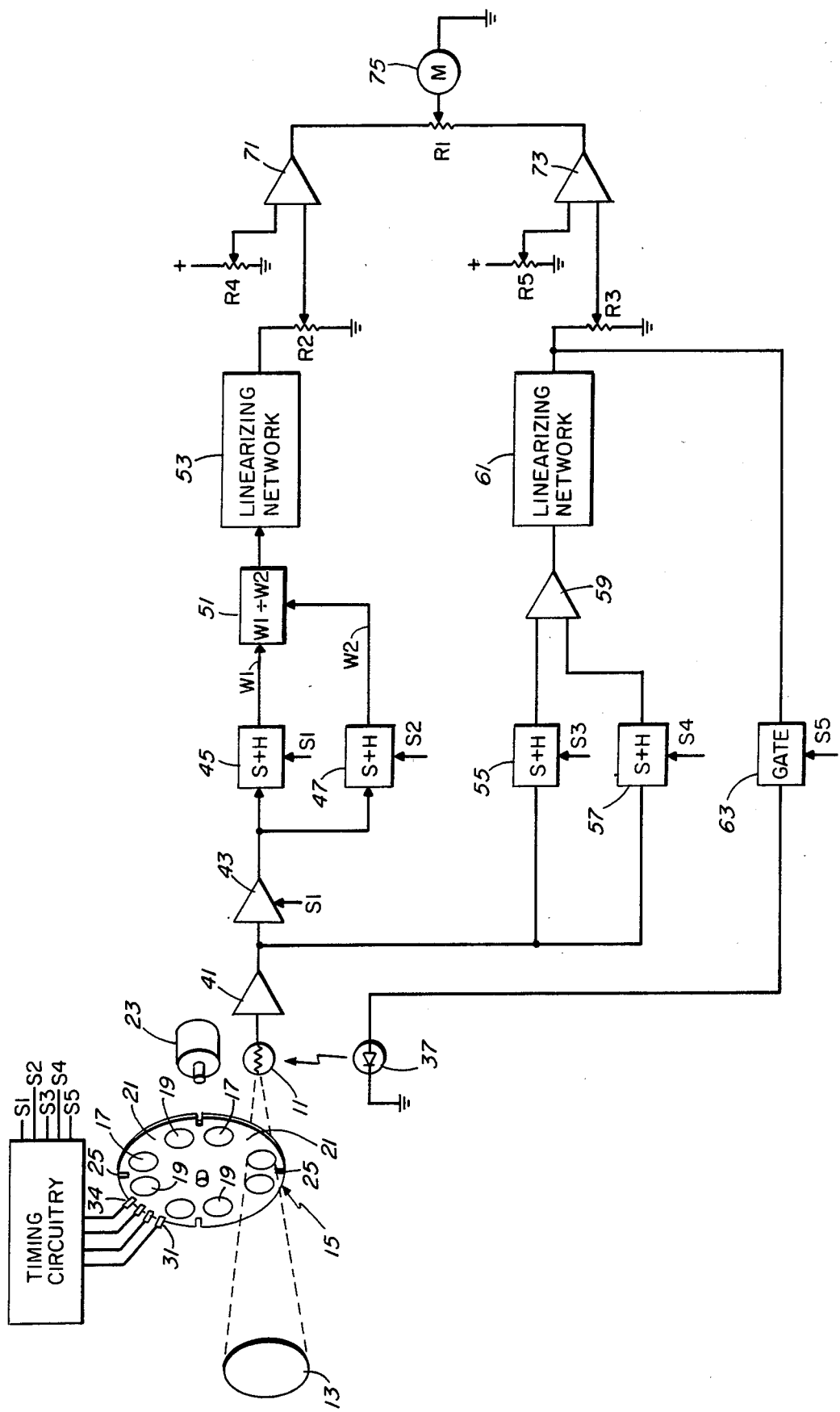

TEMPERATURE MEASURING APPARATUS

BACKGROUND OF THE INVENTION

The present invention relates to infrared radiometry and more particularly to non-contact temperature measuring apparatus which is relatively insensitive to the surface characteristics of the target whose temperature is being measured.

As is understood by those skilled in the art, the use of radiometric techniques for the non-contact measurement of temperatures has typically required that the instrument be designed for a particular application, taking into consideration not only the temperature range in which measurements are to be taken, but also the nature of the target and particularly its surface characteristics. As is understood, few products under manufacture conform with the ideal black body situation and emissivity and transparencies vary over wide ranges and with wavelength. Extreme examples include measuring the temperature of polished aluminum or of thin plastic films.

It has been particularly difficult to design instruments which will measure the temperature of a target without being significantly affected by surface characteristics which can vary widely even though basic identity of the target is the same. One example of such an application is the temperature measurement of aluminum ingots where the surface may be anywhere from bright to highly tarnished and coated with miscellaneous contaminants.

Among the several objects of the present invention, it may be noted the provision of a highly accurate non-contact temperature measuring device; the provision of such a device which is operable over a wide range of target temperatures; the provision of such a device which is relatively insensitive to surface characteristics of the target whose temperature is to be measured; the provision of such a device which is relatively insensitive to changes in emissivity; the provision of such a device which is relatively insensitive to surface contaminants on the target; the provision of such a device which is highly reliable and which is of relatively simple and inexpensive construction. Other objects and features will be in part apparent and in part pointed out hereinafter.

SUMMARY OF THE INVENTION

Briefly, temperature measuring apparatus according to the present invention involves an optical system for directing radiant energy from a target onto a suitable detector. First and second wavelength filters are intermittently interposed into the optical path thereby to generate respective first and second signals during respective first and second time interval. A source, such as an LED is utilized for selectively providing a controllable or reference level of energy incident on the detector during third time interval thereby to generate a respective third signal. The first and second signals are automatic gain control processed so as to hold the level of the processed first signal substantially constant. The ratio of the first and second process signals is then taken to generate a first intermediate output signal. The reference light source is energized in response to a control signal which is generated as a function of the difference between the first and third signal and a second intermediate output signal is provided which is a function of that control signal. The first and second intermediate output signals are then combined in selectable proportion thereby to generate a temperature signal which represents the temperature of the target relatively independent of surface characteristics.

BRIEF DESCRIPTION OF THE DRAWING

The single FIGURE is a partially schematic diagram illustrating temperature measuring apparatus constructed in accordance with the present invention.

DESCRIPTION OF THE PREFERRED EMBODIMENT

Referring now to the drawing, a suitable infrared detector, e.g., a lead sulfide detector, is designated by reference character 11. Radiant energy, gathered from a distant target whose temperature is to be measured, is focused on the detector 11 by an objective lens 13. A rotatable filter wheel 15 is provided between the lens 13 and detector 11.

In the embodiment illustrated, the filter wheel 15 carries four filters 17 of a first wavelength and four filters 19 of a second wavelength, the filters being arranged in a repetitive pattern with pairs of filters of different wavelength being closely adjacent and with a opaque region 21 between each set of pairs. Wheel 15 is driven at a constant rotational speed by a suitable motor 23.

Associated with each pair of filters is a notch 25 in the periphery of wheel 15. A series of optical interrupter modules 31–34 are provided to sense the passing of the notch 25 during rotation of the wheel, thereby to generate respective timing pulses utilized by the signal processing circuitry described hereinafter.

In addition to the radiant energy gathered from the target, the detector 11 also receives radiation from a light emitting diode (LED) 37 mounted adjacent the detector. As is described in greater detail hereinafter, LED 37 acts as a synchronized controllable source selectively providing an adjustable level of energy incident on the detector. As is also described hereinafter, LED 37 is energized during time intervals when the opaque sectors 21 of the wheel 15 are over the detector 11 so that interference with the target radiation is avoided. It can thus be seen that the signal obtained from the detector 11 is a composite or time-multiplexed signal. The components of this time-multiplexed signal are sorted out or demultiplexed by several sample-and-hold circuits described in greater detail hereinafter to obtain first, second and third detector signals.

The output signal from the detector 11 is first applied to a high gain linear amplifier 41 to obtain signal levels suitable for further processing. As indicated previously, the present apparatus comprises two distinct channels. In one channel, the output from the linear amplifier 41 is applied to a variable gain amplifier 43 which is utilized in an automatic gain control (AGC) mode of operation. The output signal from the variable gain amplifier 43 is applied to first and second sample-and-hold circuits, 45 and 47 respectively. Each of these sample-and-hold circuits 45 and 47 is selectively actuated or gated on when a filter of the first and second wavelength, respectively, is passing in front of the detector 11 the gating being controlled by the timing signals S1 and S2 respectively. The output signals from the sample-and-hold circuits 45 and 47 are conveniently designated W1 and W2 respectively.

The variable gain amplifier 43 is gated by the same timing signal (S1) as the sample and hold circuit 45, thereby to establish an automatic gain control mode of operation which tends to hold the output level from the first sample-and-hold circuit at a fairly stable level. As will be understood, this same level of gain is maintained and applied to the signal which is sampled and held by the sample-and-hold circuit 47.

An analog dividing circuit 51 is employed to obtain a first intermediate output signal which is a function of the ratio of the two gain-control processed signals W1 and W2. As is understood by those skilled in the art, this ratio is indicative, in a non-linear fashion, of the temperature of the target, assuming that the target radiates substantially as a black body. In other words, the upper part of the circuit essentially comprises a two color radiometer. A linearization circuit 53 provides a transfer function suitable for modifying the signal amplitude into a fairly linear representation of the temperature so measured. As is understood, suitable transfer functions can be synthesized by an array of diodes and resistors.

In the second channel, the output of the linear amplifier 41 is applied directly to each of a pair of sample-and-hold circuits, 55 and 57 respectively. Sample-and-hold circuit 55 is actuated or gated by timing signal S3 when a filter of the first wavelength is passing in front of the detector 11, timing signal S3 being coextensive with timing signal S1. The sample-and-hold circuit 57 is actuated or gated by timing signal S4 while an opaque area 21 is interposed between the target and the detector. The output signals from the two sample-and-hold circuits 55 and 57 are compared in a differential amplifier 59 to generate a control signal which is a function of the difference between the demultiplexed first and third detector signals.

The outputs of signal from differential amplifier 59 is applied, through a linearizing circuit 61 and a gating circuit 63, to the LED light source 37. Gating circuit 63 is actuated by timing signal S4 to energize the LED 37 when the opaque regions 21 of the filter wheel 15 are interposed between the target and the detector 11, timing signal S5 being substantially coextensive with timing signal S4. As is understood by those skilled in the radiometry art, a closed loop servo system is thus formed which varies the energization of the LED 37 to a level such that the effective level of radiation on the detector 11 from the LED light source essentially balances that received from the target through the first wavelength filters. In other words, the first and third detector signals are held essentially equal. As is likewise understood in the art, the output signal from the differential amplifier 59 constitutes an indication, although non-linear, of the temperature of the target predicated upon the brightness at the selected (first) wavelength. In other words, the lower portion of the circuitry comprises a brightness radiometer which shares a detector and a filter wheel with the two color radiometer of the upper part of the circuitry. This technique of using an LED as a reference source provides a means of eliminating drift effects from the detector when it is being used in the brightness radiometer mode. The linearization circuit 61 provides a transform function to obtain an essentially proportional signal level suitable for driving a meter or display. While similar techniques can be used for fabricating the two linearization circuits 53 and 61, it should be understood that the desired transfer functions are, in fact, quite different.

Each of the linearized intermediate output signals is applied to one end of a mixing potentiometer R1 through a respective differential amplifier 71 and 73. Each of these intermediate signals is applied to the respective differential amplifier through a respective gain adjustment potentiometer, R2 or R3, so to allow a respective meter "span" adjustment. Similarly, a fixed voltage is applied to the other input of each of the differential amplifiers, by means of respective potentiometers R4 and R5, thereby to allow an arbitrary zero setting to be made. By means of the potentiometer R1, selectable proportions of the first and second intermediate output signals are combined, the mixed or combined signal being applied to an appropriate digital display or meter 75.

In accordance with the concept of the present invention, it has been found that, while both color and brightness radiometric readings are affected by variations in surface characteristics, and affected somewhat unpredictably, a given disruptive influence will tend to affect the two measurements in opposite directions, though by differing amounts. By combining a selectable proportion of the two intermediate output signals, the proportion being selected in experimental accordance with the particular type of target, it has been found that a high degree of insensitivity to surface characteristics can be provided.

For example, in setting up the instrument, each of the intermediate output signals is first adjusted or set in conjunction with a calibrated black body radiator and then the setting of the mixing potentiometer R1 is determined by examining targets of differing surface characteristics, while actual temperature is determined by independent means, e.g., a thermocouple. In this way settings are arrived at which allow temperature measurements to be made which are relatively insensitive to the surface characteristics of the target.

In view of the foregoing, it may be seen that the several objects of the present invention are achieved and other advantageous results have been attained.

As various changes could be made in the above constructions without departing from the scope of the invention, it should be understood that all matter contained in the above description or shown in the accompanying drawings shall be interpreted as illustrative and not in a limiting sense.

What is claimed is:

1. Temperature measuring apparatus for measuring the temperature of a target comprising:
    a detector for radiant energy;
    optical means for directing radiant energy from the target onto said detector;
    means located between the target and said detector for alternately interposing first and second wavelength filters into the optical path of the directed energy during respective first and second time intervals thereby to generate, from said detector, respective first and second detector signals during said first and second time intervals;
    source means timed in synchronism with said filter interposing means for selectively providing a controllable level of energy incident on said detector thereby to generate, from said detector, a third detector signal during a third time interval; which is between said first and second time intervals;
    dividing circuit means for generating a first intermediate signal which is a function of the ratio of the first and second detector signals;

circuit means for generating a control signal which is a function of the difference between said first and third signals and for energizing said source means as a function of said control signal;

means for providing a second intermediate signal which is a function of said control signal; and means for combining said first and second intermediate signals in selectable proportion thereby to generate a temperature signal which represents the temperature of the target relatively independent of target surface characteristics.

2. Temperature measuring apparatus for measuring the temperature of a target comprising:

a detector for radiant energy;

optical means for directing radiant energy from the target onto said detector;

means located between the target and said detector for alternately interposing first and second wavelength filters into the optical path of the directed energy during respective first and second time intervals thereby to generate, from said detector, respective first and second detector signals during said first and second time intervals;

source means timed in synchronism with said filter interposing means for selectively providing a controllable level of energy incident on said detector thereby to generate, from said detector, a third detector signal during a third time interval which is between said first and second time intervals;

circuit means for automatic gain control processing of said first and second signals to hold the level of the processed first signal substantially constant;

dividing circuit means for generating a first intermediate signal which is a function of the ratio of the first and second processed signals;

circuit means for generating a control signal which is a function of the difference between said first and third signals and for energizing said source means as a function of said control signal;

means for providing a second intermediate signal which is a function of said control signal; and means for combining said first and second intermediate signals in selectable proportion thereby to generate a temperature signal which represents the temperature of the target relatively independent of target surface characteristics.

3. Temperature measuring apparatus for measuring the temperature of a target comprising:

a detector for radiant energy;

optical means for directing radiant energy from the target onto said detector;

means located between the target and said detector for alternately interposing first and second wavelength filters into the optical path of the directed energy during respective first and second time intervals thereby to generate, from said detector, respective first and second detector signals during said first and second time intervals;

source means timed in synchronism with said filter interposing means for selectively providing a controllable level of energy incident on said detector thereby to generate, from said detector, a third detector signal during a third time interval which is between said first and second time intervals;

circuit means including a variable gain amplifier and a pair of sample-and-hold circuits for automatic gain control processing of said first and second signals to hold the level of the processed first signal substantially constant;

dividing circuit means for generating a first intermediate signal which is a function of the ratio of the first and second processed signals;

circuit means including a second pair of time sample-and-hold circuits and a differential amplifier for generating a control signal which is a function of the difference between said first and third signals;

means for energizing said source means as a function of said control signal;

means for providing a second intermediate signal which is a function of said control signal;

potentiometer means for combining said first and second intermediate signals in selectable proportion thereby to generate a temperature signal; and display means for indicating a temperature value in accordance with the amplitude of said temperature signal.

* * * * *